(12) United States Patent
Bartylla et al.

(10) Patent No.: US 10,151,828 B2
(45) Date of Patent: Dec. 11, 2018

(54) SENSOR SYSTEM

(71) Applicant: Robert Bosch GmbH, Stuttgart (DE)

(72) Inventors: David Bartylla, Leonberg (DE); Attila Kovacs, Gerlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 364 days.

(21) Appl. No.: 14/914,212

(22) PCT Filed: Jul. 9, 2014

(86) PCT No.: PCT/EP2014/064668
§ 371 (c)(1),
(2) Date: Feb. 24, 2016

(87) PCT Pub. No.: WO2015/028184
PCT Pub. Date: Mar. 5, 2015

(65) Prior Publication Data
US 2016/0209501 A1 Jul. 21, 2016

(30) Foreign Application Priority Data

Aug. 30, 2013 (DE) .......... 10 2013 217 362

(51) Int. Cl.
*G01S 7/00* (2006.01)
*G01S 7/521* (2006.01)
(Continued)

(52) U.S. Cl.
CPC .............. *G01S 7/521* (2013.01); *G10K 9/122* (2013.01); *G01S 2015/938* (2013.01)

(58) Field of Classification Search
USPC ........................................................ 367/180
See application file for complete search history.

(56) References Cited

U.S. PATENT DOCUMENTS 5,171,387 A    12/1992  Wuchinich
5,415,175 A *   5/1995  Hanafy ................. B06B 1/0622
                                                          310/367
(Continued)

FOREIGN PATENT DOCUMENTS

DE         102012003495         8/2013

OTHER PUBLICATIONS

Kossoff, G: "The Effects of Backing and Matching on the Performance of Piezoelectric Ceramic Transducers", IEEE Transactions on Sonics and Ultrasonics; IEEE, vol. 13, No. 1, Mar. 1, 1996, pp. 20-30.

(Continued)

*Primary Examiner* — James R Hulka
(74) *Attorney, Agent, or Firm* — Norton Rose Fulbright US LLP; Gerard Messina

(57) ABSTRACT

A sensor system is provided which includes an electroacoustic transducer, which is designed as a thickness oscillator and accordingly includes a front element having a bottom area and an end face, at least one disk-shaped piezoelectric element having a first surface and a second surface, and a rear element having a first end face and a second end face, the end face of the front element being coupled to a diaphragm which is suitable for emitting and receiving sound waves. The bottom area of the front element is joined to the first surface of the piezoelectric element integrally and/or in a force-fit manner, and the second end face of the rear element is joined to the second surface of the piezoelectric element integrally and/or in a force-fit manner. The distance between the first end face and the second end face of the rear element, plus half of the thickness of the piezoelectric element, corresponds to half of the wavelength of a resonance oscillation of the sensor system in the thickness direction.

8 Claims, 2 Drawing Sheets

(51) Int. Cl.
*G10K 9/122* (2006.01)
*G01S 15/93* (2006.01)

(56) References Cited

U.S. PATENT DOCUMENTS

| | | | |
|---|---|---|---|
| 5,706,564 A | 1/1998 | Rhyne | |
| 2004/0160144 A1* | 8/2004 | Daft | ............ B06B 1/0292 310/334 |
| 2010/0020646 A1 | 1/2010 | Massa | |
| 2010/0208553 A1 | 8/2010 | Massa | |

OTHER PUBLICATIONS

Ibata, K. et al: "An Air-Coupled Ultrasonic Sensor Applying a Dimorph Structure" in Ultrasonics Symposium (IUS), 2012 IEEE International digital Objekt Identifier: 10.1109/ULTSYM.2012.0605. 2012; pp. 2420-2423; http://ieeexplore_ieee.org; Mar. 25, 2014.
International Search Report for PCT/EP2014/064668, dated Oct. 2, 2014.

\* cited by examiner

SENSOR SYSTEM

FIELD

The present invention is directed to a system including an electroacoustic transducer, including a front element, a piezoelectric element, and a rear element which is coupled to a diaphragm.

BACKGROUND INFORMATION

To be able to attach ultrasonic sensors to the vehicle invisibly from the outside and protected from environmental influences, in particular when using surroundings detection systems of motor vehicles, it is conventional to provide ultrasonic transducers which are situated hidden, i.e., invisibly from the outside, on internal surfaces of lining or body elements, for example on an internal surface of a bumper.

An ultrasonic sensor is described in U.S. Published Application No. 2010/0020646 A1, for example, which is designed in the form of a thickness oscillator and suitable for a hidden installation. Proceeding from a piezoceramic including electrodes, at least one front element is provided, which has such a shape that a desired directional characteristic is created. The length of the transmission path corresponds to $\lambda/4$ at the resonance frequency $f_R$, so that an amplification of the oscillation, proceeding from the piezoceramic, is achieved on the radiating surface. It is furthermore shown that a $\lambda/2$ oscillator is preferably used for some applications, which is more robust in particular with respect to temperature stability, susceptibility to soiling, and deposits. The $\lambda/2$ oscillator described in U.S. Published Application No. 2010/0020646 A1 includes a front element and a rear element, the respective length of the front and rear elements, plus half of the thickness of the piezoceramic disk, corresponding to one quarter of the wavelength A of the sound in the particular material. U.S. Published Application No. 2010/0208553 A1 describes a similar configuration.

In such configurations, which provide a sound transducer which may be mounted invisibly behind a lining element, for example the bumper of a vehicle, an area of the lining element is induced to oscillate by excitation of the sound transducer. This area, in turn, emits sound and thus acts as a diaphragm. According to the same active principle, incident sound may induce the diaphragm to oscillate and prompt the sound transducer to generate a corresponding electrical signal. Such a sensor system, as described in U.S. Published Application No. 2010/0208553 A1 for example, is schematically shown in FIG. 1. Such a configuration has the disadvantage that the free end of rear element 30 oscillates freely and may thereby emit inadvertent sound. In addition, mechanical impacts may result in a high load on the adhesive bonds, in particular due to tensile stresses, when the sound transducer is mounted on the rear element, in particular with a horizontal installation. U.S. Published Application No. 2010/0208553 A1 describes that a mounting in the area above the piezoceramic is possible to avoid these problems. It is not advantageous to mount the rear element since this would impair the $\lambda/4$ oscillation of the rear element.

In the specification of the wavelength, it should be noted that the wavelength A of an oscillation generally results as a quotient from the propagation velocity $c_S$ (sound velocity) and the frequency f of the oscillation:

$$\lambda = c_s/f.$$

Since the frequency f is predefined in such sensor systems (by the excitation of the piezoelectric element or by the frequency of the incident sound waves) and the propagation velocity $c_s$ is generally material-dependent, a different wavelength $\lambda_v$ may possibly result for the front area of the thickness oscillator (front element, diaphragm) than for the rear area (rear element), where the wavelength $\lambda_r$ arises.

SUMMARY

The present invention is based on the idea of modifying the configuration of an electroacoustic transducer described in the related art in such a way that a mechanically stable support and mounting at the rear element of an electroacoustic transducer designed as a thickness oscillator is made possible, without resulting in an impairment of the oscillation behavior of the transducer. Furthermore, complex mounting concepts are eliminated by an example configuration according to the present invention.

According to the present invention, a sensor system is provided which includes an electroacoustic transducer, which is designed as a thickness oscillator and accordingly includes a front element having a bottom area and an end face, at least one disk-shaped piezoelectric element having a first surface and a second surface, and a rear element having a first end face and a second end face, the end face of the front element being coupled to a diaphragm which is suitable for emitting and receiving sound waves. The bottom area of the front element is joined to the first surface of the piezoelectric element integrally and/or in a force-fit manner and/or in a form-locked manner, and the second end face of the rear element is joined to the second surface of the piezoelectric element integrally and/or in a force-fit manner and/or in a form-locked manner. An integral joint may be understood to mean a joint by adhesive bonding, for example. A force-fit joint may be understood to mean a joint by screwing or clamping, for example. A form-locked joint may be understood to mean a joint by framing, for example. These options of joining the described surfaces may be arbitrarily combined and adapted to the requirements of the use of the sensor system according to the present invention.

The end face of the front element, the bottom area of the front element, the first surface and the second surface of the piezoelectric element, and the first end face and the second end face of the rear element are each situated in parallel to each other and may in particular have the same shape and size. The described surfaces may have a circular, oval, rectangular or square shape, for example. This corresponds to a conventional configuration of an electroacoustic transducer designed as a thickness oscillator, as it is described in U.S. Published Application No. 2010/0020646 A1, for example. The directional characteristic of the sensor system may advantageously be adapted with the aid of the shape and size of the respective surface areas and their ratios to each other.

The term electroacoustic transducer within the meaning of the present invention should be broadly interpreted and includes transducer systems which operate according to electrostatic, magnetorestrictive, piezoelectric effects or combinations of these effects. Within the scope of the present invention, in particular a piezoelectric element may be provided as the transducer element, preferably sound waves in the ultrasonic range being converted. In this way, the electroacoustic transducer according to the present invention may in particular be used in an ultrasonic sensor for surroundings detection, for example in motor vehicles or in robotics.

The diaphragm, to which the end face of the front element of the electroacoustic transducer according to the present invention is coupled, is formed, for example, by an outer skin of a bumper, a side mirror or a door area of a motor vehicle, so that the electroacoustic transducer is situated hidden behind the outer skin. Due to the coupling, the diaphragm is ideally resonantly excited.

Preferably it is provided that the diaphragm is formed of a thin material layer, which is made from a polymer material, for example. The diaphragm preferably has a thickness between 0.1 mm and 5 mm, particularly preferably less than 3 mm, or less than 2 mm. The coupling of the front element at its end face to the diaphragm may take place directly or indirectly; however, in any case in such a way that an acoustic coupling is enabled to a sufficient degree, i.e., that suitable oscillations are transmittable. The coupling may be accomplished, for example, by a press fit or force fit, such as by screwing in, or also by an adhesive bond. The coupling may also take place by extrusion-coating of the front element with the material of the diaphragm, which may also be referred to as embedding. A direct coupling may mean that a further material layer is provided between the resonance element and the diaphragm, for example a liquid such as a gel or an oil. The further material layer may in particular be provided to optimize the acoustic coupling between the front element and the diaphragm, for example to compensate for tolerances in the dimensions of the components or the roughness of the surfaces of the coupling partners.

According to one preferred specific embodiment, the front element and the rear element are made from different materials. The sound waves generated by the piezoelectric element are thus preferably emitted in the direction of the end face of the front element; rearward radiation is suppressed. The rear element is effective for this purpose as a so-called inertial mass, i.e., due to its mass inertia it enables the force application to the front element and is thus also used to dampen the oscillation with respect to the area in which no radiation of sound waves is desired.

The front element is preferably made from a plastic or rubber material, and the rear element is made of a metal, for example aluminum, sheet metal, steel or brass. The selection of suitable materials may be established by restrictions or specifications with respect to the reception sensitivities, transmission signal strengths or working frequencies of the electroacoustic transducer according to the present invention to be achieved. In particular, however, other environmental influences, such as the ambient temperature or, for example, the mechanical load due to vibration, may also be considered in order to establish suitable materials.

As mentioned above, the wavelength $\lambda_r$ of the oscillation for the rear area of the sensor system according to the present invention may differ from the wavelength $\lambda_v$ of the front area of the sensor system. The front area is understood to mean the section of the sensor system which includes the front element, the diaphragm, and the front half of the piezoelectric element abutting the front element. The rear area is understood to mean the section of the sensor system which includes the rear element and the rear half of the piezoelectric element abutting the rear element. The wavelength $\lambda_r$ is essentially determined by the material of the rear element. The wavelength $\lambda_v$ is generally determined by the material of the front element. The material dependency of the sound velocity results in different wavelengths at the established frequency.

It is provided according to the present invention that the distance between the first end face and the second end face of the rear element, plus half of the thickness of the piezoelectric element, corresponds to half of the wavelength $\lambda_r$ (based on the rear area of the sensor system) of a resonance oscillation of the sensor system in the thickness direction.

The thickness direction shall be understood to mean the direction of the longitudinal extension of the electroacoustic transducer, which extends generally perpendicularly to the plane of the diaphragm. The change in thickness of the piezoelectric element caused by the piezoelectric effect induces an oscillation of the combination made up of front element, rear element, and piezoelectric element in this thickness direction. As a result of the design of the rear element according to the present invention, an oscillation in the thickness direction in the form of a standing wave arises, which has a node in the area of the first end face of the rear element. As a result, the lower edge in the area of the first end face of the rear element does not oscillate in the ideal case and may thus be bonded to a housing, for example, or be mounted in another manner. This results in lower mechanical stresses with horizontal installation and impact events perpendicular to the oscillation direction.

The sensor system is preferably designed in such a way that the sum of the distance between the bottom area and the end face of the front element, i.e., the length of the front element, and half of the thickness of the piezoelectric element and the thickness of the diaphragm corresponds to one quarter of the wavelength $\lambda_v$ (based on the front section of the sensor system) of the excited oscillation of the sensor system in the thickness direction.

The sensor system preferably includes an, in particular, pot-shaped housing, which surrounds the electroacoustic transducer and protects the same from environmental influences. The first end face of the rear element is preferably joined to the housing integrally and/or in a force-fit manner, for example by adhesive bonding and/or screwing. The housing is preferably designed and connected in such a way that it does not carry out any oscillations in the thickness direction. Due to the design of the rear element according to the present invention, no complex mounting is necessary in the area of the piezoelectric element.

The rear element preferably has a rod-shaped design having a circular or oval or rectangular cross-sectional area. It is also possible to provide a rear element having a varying cross-sectional area across its length. The second end face of the rear element is preferably designed in such a way that its shape and size correspond to the second surface of the piezoelectric element.

The front element may also have a varying cross-sectional area across its length. The end face of the front element may have a circular or oval or rectangular design. Due to the shape, orientation and size of the end face of the front element, it is possible in particular to adapt the directional characteristic of the sensor system. The front element may also have a stepped design in the area of the connection to the diaphragm. In this way, the coupling of the oscillations into the diaphragm may be varied.

In one preferred embodiment, the front element includes a first plate, which includes the bottom area and is coupled to the piezoelectric element. The front element furthermore includes a second plate, which has the end face and is coupled to the diaphragm. The front element moreover includes a rod-shaped section which connects the first plate and the second plate to each other, the cross-sectional area of the rod-shaped section being smaller than the bottom area and smaller than the end face. Due to this design of the front element, a desired directional characteristic is easily achievable.

The diaphragm is preferably designed as an outer skin of a lining element, for example of a body part, for a motor vehicle, the end face of the front element of the electroacoustic transducer being coupled to an internal surface of the lining element in such a way that the electroacoustic transducer is not visible from the outside. Acoustic signals from the electroacoustic transducer may be transmitted and received through the outer skin. When a sensor system according to the present invention is used as or in an ultrasonic sensor for a vehicle, this has the particular advantage that the sensor system is not visible from outside the vehicle. The electroacoustic transducer is thereby protected from environmental influences and damage, and the attachment to points of the vehicle is made possible, to which previously the attachment of a visible ultrasonic sensor was refrained from for aesthetic reasons.

DETAILED DESCRIPTION OF EXAMPLE EMBODIMENTS

Figure 1A:
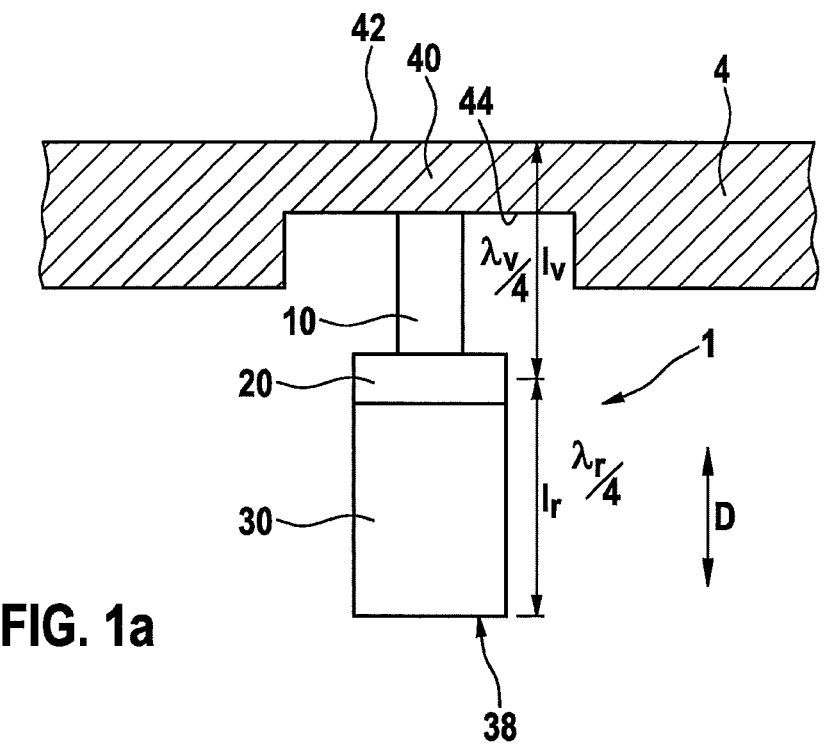
FIGS. 1a and 1b (collectively FIG. 1) shows a sensor system according to the related art.

FIG. 1 shows a sensor system according to the related art schematically in a section. The sensor system includes an electroacoustic transducer 1 which is designed as a thickness oscillator and acoustically coupled to a diaphragm 40. Electroacoustic transducer 1 includes a rod-shaped front element 10, a disk-shaped piezoelectric element 20, and a rod-shaped rear element 30. An end face of front element 10 is attached to an internal surface 44 of diaphragm 40 by adhesive bonding. Diaphragm 40 is part of a lining element 4, for example of a bumper of a motor vehicle. Front element 10, piezoelectric element 20, and rear element 30 are also preferably joined to each other by adhesive bonding.

With the aid of electrodes (not shown), it is possible to apply voltage signals to piezoelectric element 20, whereby electroacoustic transducer 1 is excited to carry out oscillations in thickness direction D. In this conventional system, distances $l_v$ from surface 42 of diaphragm 40 to the center (viewed in the thickness direction) of piezoelectric element 20 and $l_r$ from the center (viewed in the thickness direction) of piezoelectric element 20 to lower end face 38 of rear element 30 are selected in such a way that, upon excitation of electroacoustic transducer 20 using a resonance frequency, a standing wave having a wavelength $\lambda_v$ is formed in the area of front element and one having a wavelength $\lambda_r$ is formed in the area of rear element, and the distances $l_v$ and $l_r$ each correspond to one quarter of the wavelength $\lambda_v$ or $\lambda_r$ based on the front or the rear area of sensor system 1.

Figure 1B:
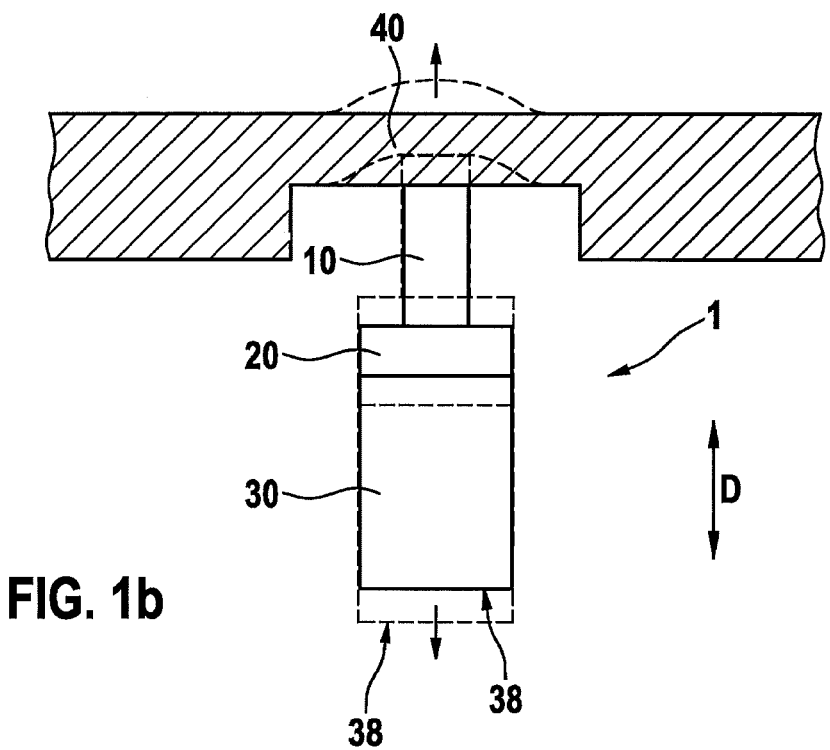

FIG. 1a) shows the sensor system at rest. FIG. 1b), superimposed in dotted lines, schematically shows the deflection of the respective components (not true to scale) with an excited oscillation. Due to the fact that end face 38 of rear element 30 is situated on an antinode of the standing wave, the deflection is particularly large in the area of end face 38 of rear element 30. This results in the described disadvantages of the high mechanical load on the adhesive bonds due to impacts and that it is not possible to mount rear element 30 itself in the area of end face 38 without impairing the oscillation.

Figure 2:
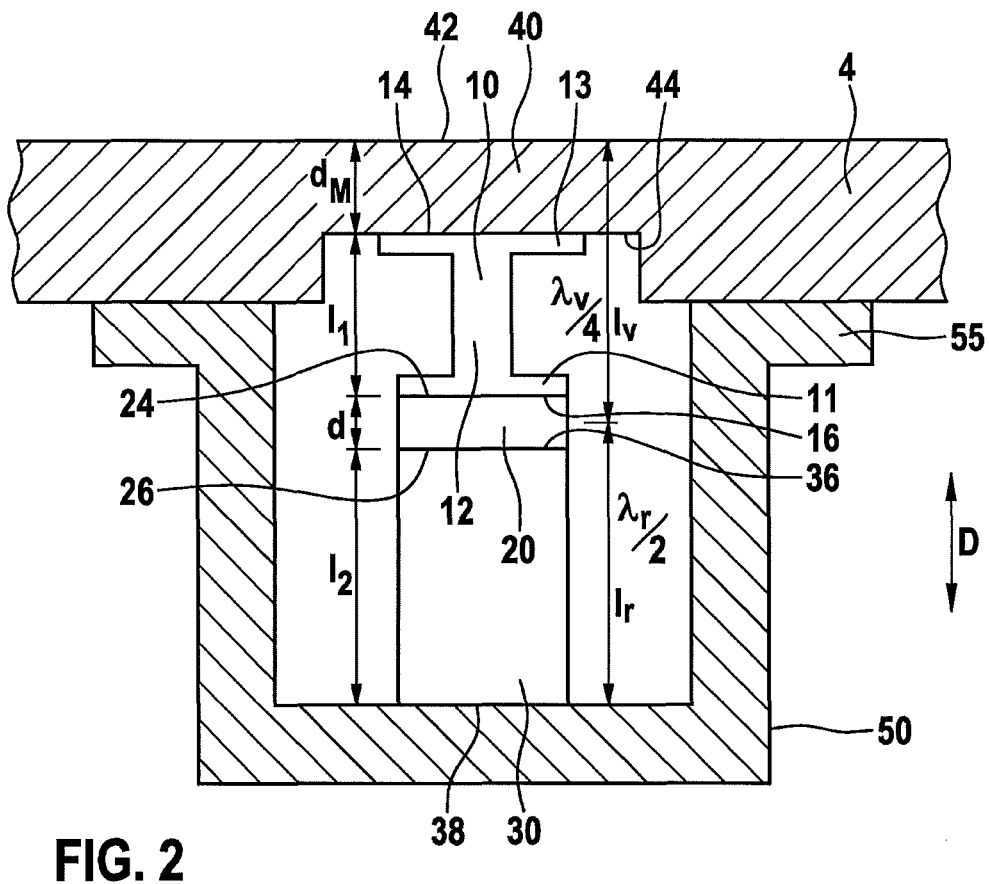
FIG. 2 shows a sensor system according to a first exemplary embodiment of the present invention.

FIG. 2 shows a sensor system according to the present invention schematically in a section, which overcomes the disadvantages of the related art. Analogously to the known embodiment, the sensor system includes an electroacoustic transducer 1 which is designed as a thickness oscillator and acoustically coupled to a diaphragm 40. Electroacoustic transducer 1 includes a rod-shaped front element 10 having a round or rectangular cross section, for example, a piezoelectric element 20, which is disk-shaped in this example, having a thickness d, and a rod-shaped rear element 30. Piezoelectric element 20 may alternatively have a cuboid design. An end face of front element 10 is attached to an internal surface 44 of diaphragm 40 by adhesive bonding. Diaphragm 40 is part of a lining element 4, for example of a bumper of a motor vehicle.

Front element 10 has a bottom area 16 and an end face 14. Piezoelectric element 20 is designed as a thin ceramic disk and situated in parallel to a radiation plane of transducer 1. Piezoelectric element 20 has a first surface 24 and a second surface 26 situated opposite first surface 24. Furthermore, electroacoustic transducer 1 includes a rear element 30 having a first end face 38 and a second end face 36. Bottom area 16 of front element 10 is joined to first surface 24 of piezoelectric element 20 integrally and/or in a force-fit manner, for example by adhesive bonding or screwing. Second end face 36 of rear element 30 is joined to second surface 26 of piezoelectric element 20 integrally and/or in a force-fit manner. The front element has a length (in direction D) $l_1$ corresponding to the distance between end face 14 and bottom area 16. The back element has a length $l_2$ corresponding to the distance between first end face 38 and second end face 36.

Front element 10 and rear element 30 are used to transmit and amplify acoustic waves which are generated or received by piezoelectric element 20. For this purpose, piezoelectric element 20 includes electrodes and electrical contacts (not shown) using which voltage signals may be applied to piezoelectric element 20 or voltage signals or charge transfers generated by piezoelectric element 20 may be received. The piezoelectric element may include a piezoceramic, for example. Arrow D indicates the main oscillation direction (thickness mode oscillation) of electroacoustic transducer 1 according to the present invention.

End face 14 of front element 10 is coupled to an internal surface 44 of a diaphragm 40 having thickness $d_M$, which is suitable for emitting or receiving sound waves. If electroacoustic transducer 1 is used as an ultrasonic sensor in a motor vehicle, diaphragm 40 may be the outer skin or an area of an outer skin of a lining element 4, for example, such as of a bumper. Electroacoustic transducer 1 is then situated on the internal side of lining element 4 and thus is not visible from the outside. Electroacoustic transducer 1 is thereby protected from dirt and weather influences.

Electroacoustic transducer 1 furthermore includes a housing 50, which is shown only schematically here. Housing 50 is used for clamping the combination made up of front element 10, piezoelectric element 20, and rear element 30. Housing 50 is joined to rear element 30 at first end face 38 in this example, e.g., by adhesive bonding. Housing 50 has a pot-shaped design in this example and includes a flange 55. At flange 55, housing 50 may be attached to the internal side of lining element 4, for example by adhesive bonding or screwing. Housing 50 is designed in such a way that it does not oscillate.

According to the present invention, it is provided that rear element 30 has a length 1 which is selected in such a way that sum $l_r$ of length $l_2$ of rear element 30 and half of the thickness d of piezoelectric element 20 corresponds to half of the wavelength $\lambda_r$ of a resonance oscillation of the sensor system in thickness direction D. Distance $l_v$, measured from surface 42 of diaphragm 40 to half of the thickness d of piezoelectric element 20, corresponds to one quarter of the wavelength $\lambda_v$ of a resonance oscillation of the sensor system in thickness direction D.

Accordingly, the following equations apply:

$$l_r = l_2 + d/2 = \lambda_r/2$$

$$l_v = l_1 + d_M + d/2 = \lambda_v/4$$

In other words, taking the possibly different materials into consideration, the length ratios of front element 10, of piezoelectric element 20, and of rear element 30 are selected in such a way that a standing wave is formed upon a piezoelectric or acoustic excitation of the electroacoustic transducer with a resonance frequency, the standing wave having a wave node, i.e., an area which ideally experiences no or only a minor deflection, in the area of piezoelectric element 20 and in the area of first end face 38 of rear element. In this way, it is possible to mount the rear element in the area of first end face 38 on housing 50, without impairing the oscillation and thus the reception sensitivity or the signal strength of the sensor system. The indicated distances or lengths $l_1$, $l_2$, $l_r$, $l_v$, d, $d_M$ shall each be considered in the idle state of the sensor system.

Figure 3:
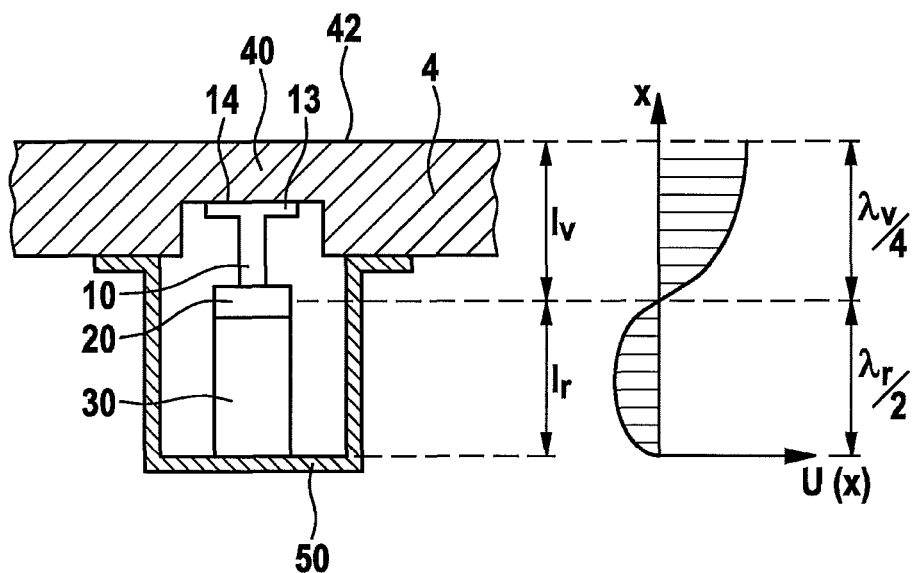
FIG. 3 shows a sensor system according to a second exemplary embodiment of the present invention together with a representation of the deflection across the component length.

These circumstances are clarified once again in FIG. 3 in that the maximum deflection U(x) in longitudinal direction x of a sensor system according to the present invention is shown.

In the embodiment of the present invention shown in FIG. 2, the front element has a varying cross-sectional area across its length. Front element 10 includes a first plate 11, which has bottom area 16. First plate 11 or bottom area 16 corresponds in its size and shape generally to first surface 24 of the piezoelectric element. Front element 10 furthermore includes a second plate 13, which has end face 14. Second plate 13 or end face 14 in this example has a larger cross-sectional area than first plate 11. The front element 10 moreover includes a rod-shaped section 12 which connects first plate 11 and second plate 13, the cross-sectional area of rod-shaped section 12 being smaller than bottom area 16 and also smaller than end face 14. The front element thus configured may have a one-piece or multi-piece design. In the case of a multi-piece design, first plate 11, second plate 13, and rod-shaped section 12 may be designed as separate components, which are joined by adhesive bonding or screwing, for example, to form a front element 10. It is also possible to design front element 10 in one piece with diaphragm 40.

The embodiment of a sensor system according to the present invention shown in FIG. 3 differs from the system shown in FIG. 2 by the design of front element 10. In the example according to FIG. 3, this element includes only a rod-shaped section 12 and a plate 13 having an increased cross-sectional area, plate 13 having end face 14 and being coupled to diaphragm 40. This results in an approximately T-shaped profile of front element 10.

What is claimed is:

1. A sensor system comprising:
   an electroacoustic transducer including a front element having a bottom area and an end face, at least one piezoelectric element having a first surface and a second surface, and a rear element having a first end face and a second end face, the end face of the front element being coupled to a diaphragm which is suitable for at least one of emitting sound waves and receiving sound waves, the bottom area of the front element being joined to the first surface of the piezoelectric element at least one of: i) integrally, ii) in a force-fit manner, and iii) in a form-locked manner, the second end face of the rear element being joined to the second surface of the piezoelectric element at least one of: i) integrally, ii) in a force-fit manner, and iii) in a form-locked manner;
   wherein a sum of a distance between the first end face and the second end face of the rear element and half of a thickness of the piezoelectric element corresponds to half of the wavelength of a resonance oscillation of the sensor system in the thickness direction,
   wherein the front element has a varying cross-sectional area across its length,
   wherein the front element includes a first plate having the bottom area, a second plate having the end face, and a rod-shaped section, which connects the first plate and the second plate, a cross-sectional area of the rod-shaped section being smaller than the bottom area and smaller than the end face.

2. The sensor system as recited in claim 1, wherein a sum of a distance between the bottom area and the end face of the front element and half of the thickness of the piezoelectric element and a thickness of the diaphragm corresponds to one quarter of the wavelength of the excited oscillation of the sensor system in the thickness direction.

3. The sensor system as recited in either claim 1, wherein the sensor system includes a pot-shaped housing, which surrounds the electroacoustic transducer, the first end face of the rear element being joined to the housing at least one of: i) integrally, and ii) in a force-fit manner.

4. The sensor system as recited in one of claim 1, wherein the rear element has a rod-shaped design having one of: i) a circular, ii) oval or iii) rectangular, cross-sectional area.

5. The sensor system as recited in claim 1, wherein the end face of the front element has one of: i) a circular, ii) oval, or iii) rectangular design.

6. The sensor system as recited in claim 1, wherein the front element includes a first plate having the bottom area, a second plate having the end face, and a rod-shaped section, which connects the first plate and the second plate, a cross-sectional area of the rod-shaped section being smaller than the bottom area and smaller than the end face.

7. The sensor system as recited in claim 1, wherein the diaphragm is designed as an outer skin of a lining element for a motor vehicle, the end face of the front element of the electroacoustic transducer being coupled to an internal surface of the lining element so that the electroacoustic transducer is not visible from the outside, acoustic signals from the electroacoustic transducer being transmittable and receivable through the outer skin.

8. An ultrasonic sensor for detecting the surroundings of a vehicle, including a sensor system, the sensor system including:
   an electroacoustic transducer including a front element having a bottom area and an end face, at least one piezoelectric element having a first surface and a second surface, and a rear element having a first end face and a second end face, the end face of the front element being coupled to a diaphragm which is suitable for at least one of emitting sound waves and receiving sound waves, the bottom area of the front element being joined to the first surface of the piezoelectric element at least one of: i) integrally, ii) in a force-fit manner, and iii) in a form-locked manner, the second end face of the rear element being joined to the second surface of the piezoelectric element at least one of: i) integrally, ii) in a force-fit manner, and iii) in a form-locked manner;

wherein a sum of a distance between the first end face and the second end face of the rear element and half of a thickness of the piezoelectric element corresponds to half of the wavelength of a resonance oscillation of the sensor system in the thickness direction, wherein the front element has a varying cross-sectional area across its length, wherein the front element includes a first plate having the bottom area, a second plate having the end face, and a rod-shaped section, which connects the first plate and the second plate, a cross-sectional area of the rod-shaped section being smaller than the bottom area and smaller than the end face.

* * * * *